Oct. 11, 1960   H. KRAUSE   2,955,484
EMERGENCY BRAKE CONTROL
Filed May 23, 1956   4 Sheets-Sheet 3

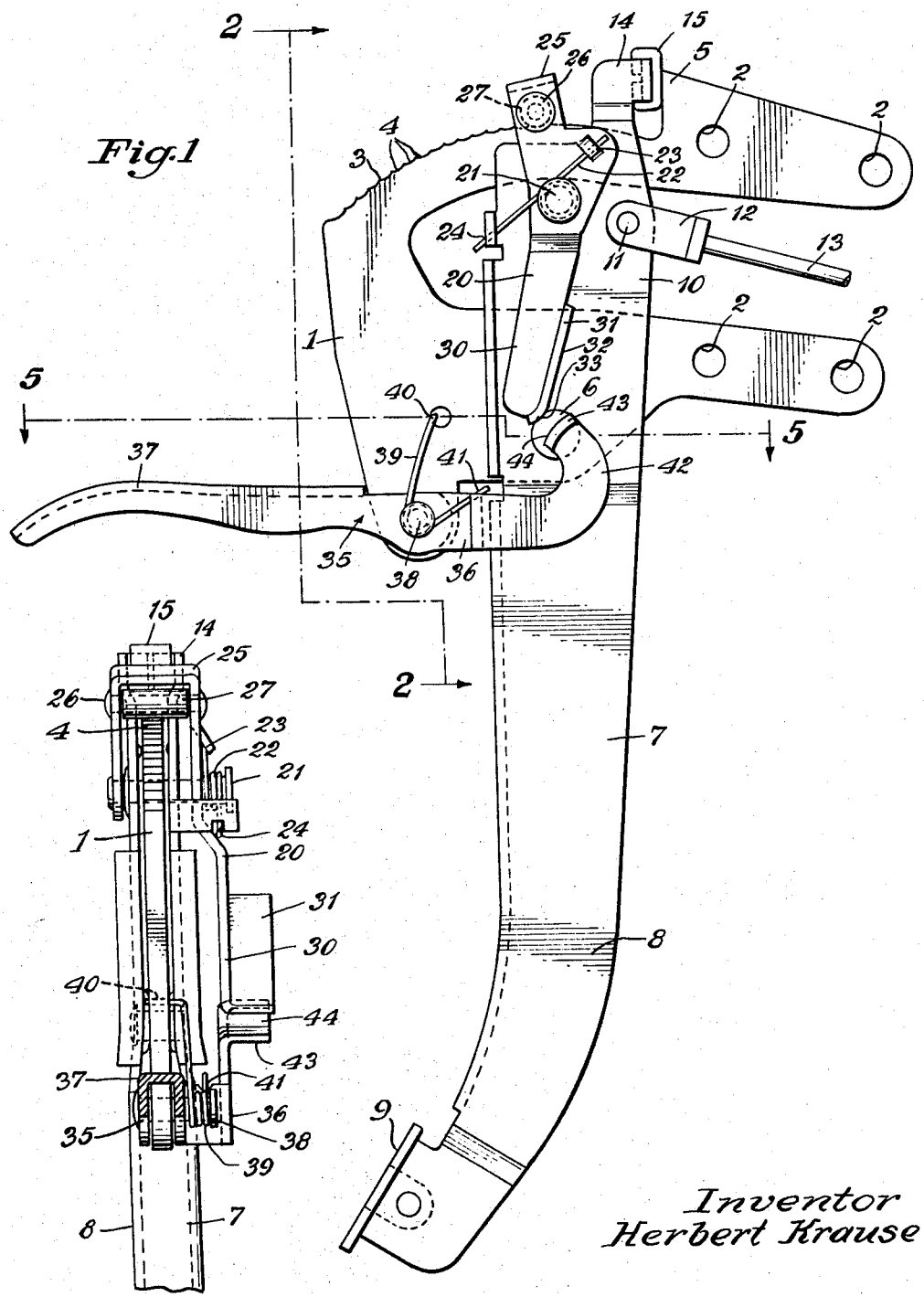

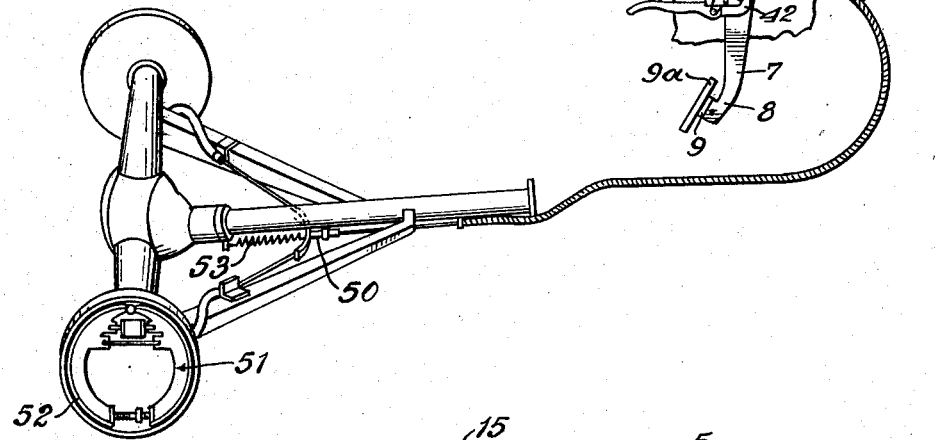
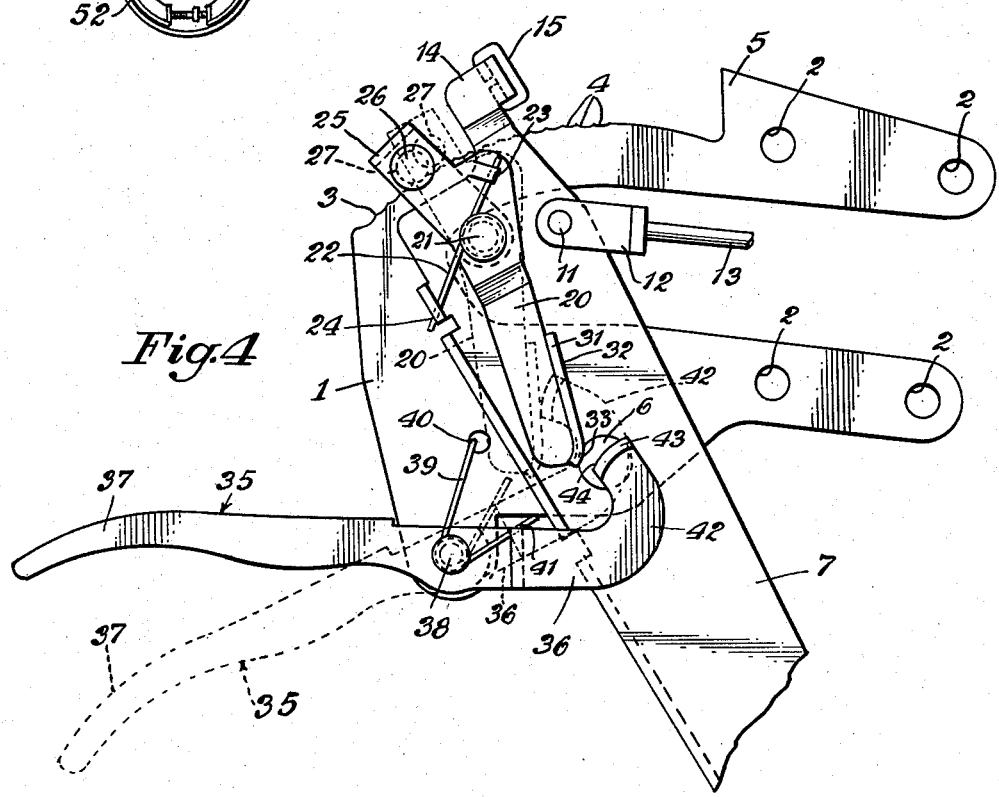

Inventor
Herbert Krause by Parker & Carter
Attorneys

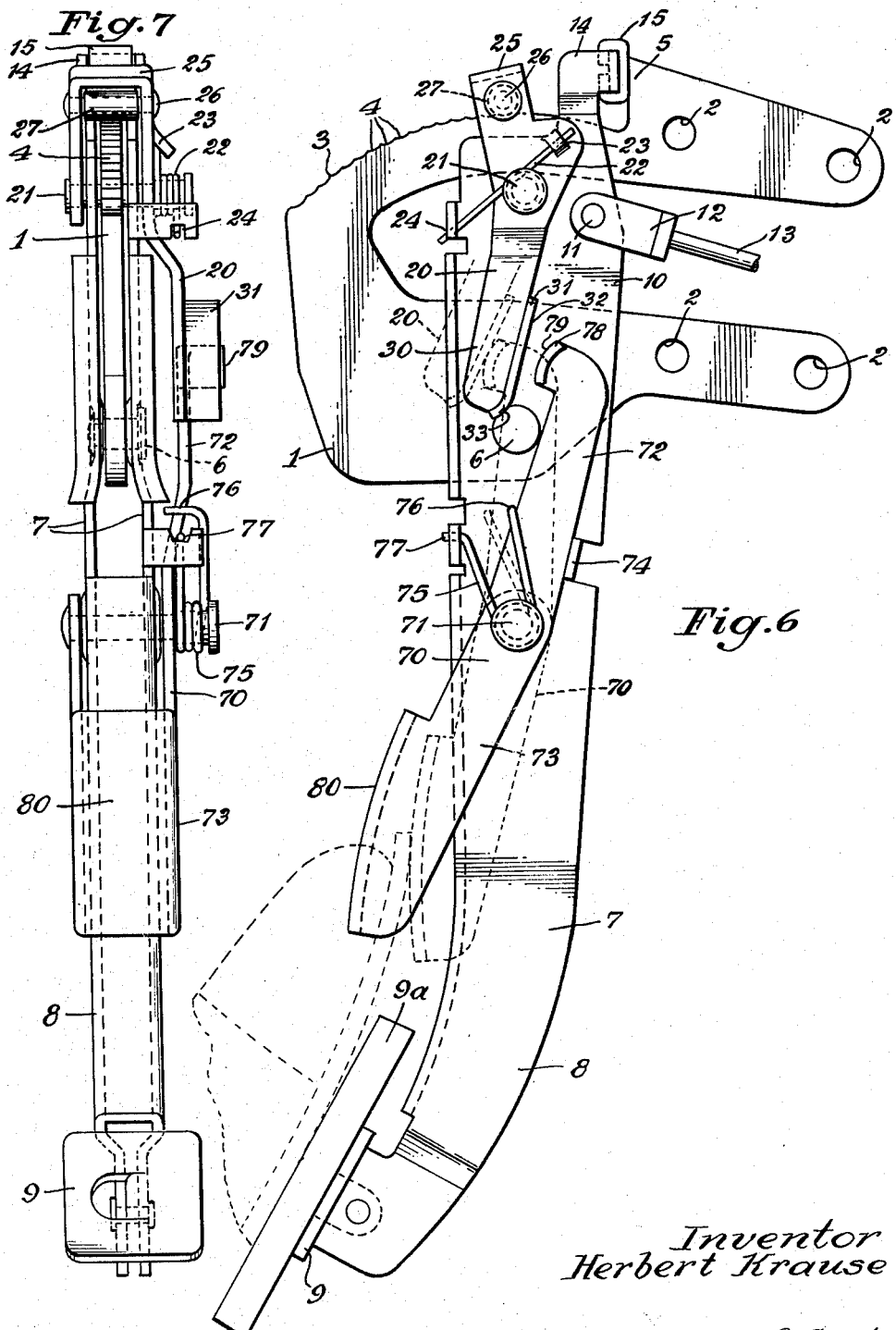

United States Patent Office 2,955,484
Patented Oct. 11, 1960

2,955,484

EMERGENCY BRAKE CONTROL

Herbert Krause, Chicago, Ill., assignor to Chicago Forging and Manufacturing Company, Chicago, Ill., a corporation of Delaware Filed May 23, 1956, Ser. No. 586,713

4 Claims. (Cl. 74—539)

This invention relates to emergency brakes for automobiles and the like and has for one purpose to provide an emergency brake which may be operated and released with maximum ease.

Another purpose is to provide an emergency brake which may be both applied and released by foot pressure of the operator.

Another purpose is to provide an emergency brake and release therefor wherein the operable release mechanism includes an arrangement permitting initial movement prior to actuation of the emergency brake release.

Another purpose is to provide an emergency brake which may be operated over a long period of time with a minimum amount of wear.

Another purpose is to provide an emergency brake and release means therefor wherein said release means include spaced abutments movable into release actuating contact.

Another purpose is to provide an emergency brake and release therefor, the brake and release being simultaneously operable to permit use of the brake in the manner of a normal vehicle brake mechanism.

Other purposes will appear from time to time during the course of the specification and drawings.

This application is a continuation-in-part of my co-pending applications Serial No. 543,294, filed October 28, 1955, and now abandoned, for "Foot Operated Emergency Brake," and Serial No. 559,873, filed January 18, 1956, for "Foot Operated Emergency Brake."

I illustrate my invention more or less diagrammatically in the accompanying drawings wherein—

Figure 1 is a side elevation of my invention;

Figure 2 is a view taken on the line 2—2 of Figure 1;

Figure 3 is a view illustrating my invention employed in association with a vehicle brake mechanism;

Figure 4 is a partial view illustrating the device of Figure 1 in another position;

Figure 6 is a side elevation illustrating another variant form of my invention, and, Figure 7 is an end elevation illustrating the device of Figure 6.

Like parts are indicated by like symbols throughout the specification and drawings.

Figure 5:
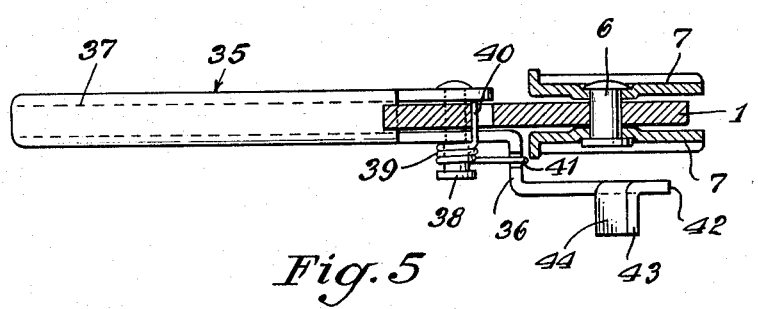
Figure 5 is a view taken on the line 5—5 of Figure 1.

Referring now to the drawings and particularly to Figure 1, the numeral 1 generally indicates a base or mounting plate having a plurality of apertures 2 which may be utilized in mounting plate 1, for example, in an appropriate location on an internal portion of a vehicle. The plate 1 has a generally arcuate edge surface 3 which may have formed thereon a plurality of scallops or serrations 4. The surface 3 may terminate adjacent an upwardly offset portion 5 on the plate 1, the purpose of which will appear hereinbelow.

Pivotally mounted on the plate 1, as at 6, is a brake lever 7. The brake lever 7 has an elongated lower extension designated generally at 8 which carries at its lower extremity a pedal mounting surface 9, the surface 9 lying in a plane tilted slightly from the vertical to provide ease of access to the foot of the vehicle operator. The lever 7 has an upper portion 10 above the pivot 6 which is movable along the plane of the plate 1. While, as illustrated best in Figures 2 and 8, the lever 7 may comprise spaced side elements positioned on opposite sides of the plate 1, but for convenience, the lever and similar elements are given a single numerical designation. Pivotally connected to the upper lever portion 10, as at 11, is a clevis or connector 12 to which a rod or cable 13 may be attached. As best seen in Figure 3, the element 13 is connected at its opposite end, through appropriate mechanism, to the brakes, or emergency brake of a vehicle. While, for illustrative purposes, Figure 3 discloses the element 13 as being connected to that type of vehicle brake mechanism wherein the emergency brake controls are associated with the normal brake mechanism, it will be understood that my invention may be associated with separate emergency brake mechanisms, as shown in my co-pending application, Serial No. 559,873, without departing from the nature and scope of my invention.

As the parts are shown in the drawings, for example, Figure 1, the brake lever 7 is shown in inoperative brakes-off position. The cable 13 extends forwardly or to the right from the brake lever 7 and the surface 3 curves rearwardly therefrom or to the lever.

The brake lever 7 carries at its upper extremity a suitable abutment portion 14 which may in turn carry a bumper member 15 which may, for example, be formed of rubber or other shock absorbing material. As best seen in Figure 1, the offset abutment 5 on the plate 1 is contacted by the bumper 15 when the brake lever 7 is moved towards maximum brakes-off position.

Figure 4 illustrates, in solid line, the brake control mechanism of my invention in brakes-on position. A locking or clutching element 20 is pivotally mounted on the brake lever portion 10 as at 21. A yielding means, such as the spring 22, may surround the pivot 21 and have its opposite ends engaged with the member 20, as at 23, and with the lever 7, as at 24, to urge the member 20 toward locking position. The member 20 has an upper extension 25 extending beyond the surface 3. Mounted on the extension 25 and extending laterally therefrom to overlie the surface 3 is a pin 26. Loosely or rotatably mounted on the pin 26 is a hollow roller or clutching sleeve 27. It will thus be clearly seen that the spring 22 urges the clutching sleeve 27 into latching or locking engagement with the serrations or grooves 4 in the edge surface 3.

Extending from the pivot 21 in a direction generally opposite from that of the extension 25, the member 20 has an extension 30 which lies along the lever 7. The extension 30 has an abutment element 31 extending laterally therefrom and having an abutment surface facing forwardly or to the right as the parts are shown in Figure 1. The abutment surface 32 may have a lower arcuate portion 33.

A release means is indicated generally by the numeral 35 and may comprise a release lever 36 having a manually operable handle portion 37 extending rearwardly or to the left as the parts are shown in the drawings, from the plate 1 in line substantially in a horizontal plane. The lever 36 is pivotally mounted on the plate 1 as at 38 and may be urged toward non-releasing position by a spring 39 coiled about the pivot 38 and having its opposite ends in engagement with the plate 1 as at 40 and the release lever 36 as at 41. Extending forwardly of the pivot 38, the lever 36 has an arcuate upwardly bent portion 42 which may carry at its extremity a curved abutment element 43 extending laterally from the portion 42 and having a curved abutment surface 44. It will be observed that the actuating abutments 31, 43 on the lock 20 and release lever 36 are spaced apart at all positions of the brake lever 7, as may be seen from a view of Figures 1 and 4. Similarly, while the release lever portion 42 lies alongside the brake lever 7, it is independent therefrom and retains its position regardless of the position of the lever 7. Accordingly, the abutment 31 on the lock 20 is of substantial extension therealong in order to permit operating contact of the release lever abutment 43 at all positions of the brake lever 7, lock or clutch means 20 and release lever 36.

While variant forms of release lever are illustrated herein, it will be observed that the clutch means disclosed throughout comprises a lateral grooved or serrated edge 3 and a loose roller 27 yieldingly urged thereagainst by the spring 22.

Figure 3 illustrates the device of Figures 1, 2 and 4 in association with an automobile brake mechanism. The cable 13 may include a flexible cable connected to a yoke element 50 which may in turn be connected by suitable means to the brake mechanism shown generally at 51. Thus counterclockwise movement of the brake lever 7, through the cable 13, produces outward movement of the brake shoe device illustrated at 52 to provide braking action for the vehicle.

Referring now to Figures 6 and 7, the mechanism at the upper portion of the figures is substantially identical with that shown in Figures 1–4 and the numerals therein applied have, for convenience, been repeated in Figures 6 and 7.

The release mechanism shown in Figures 6 and 7 comprise a release lever designated generally by the numeral 70. The lever 70 is pivotally mounted on the brake lever 7 as at 71. The lever 70 has an upwardly extending portion 72 at one side of the pivot 71 and a generally downwardly inclined opposite extension 73 on the other side of the pivot 71. The lever 70 is urged toward non-releasing position and a portion 72 thereof is urged toward stop abutment 74 by a yielding member such as the spring 75 which may be coiled about the pivot 71 and may have its opposite ends in engagement with the lever portion 72 as at 76 and with the brake lever 7 as at 77. The stop abutment 74 may comprise an ear bent from one of the side walls of brake lever 7. The upward extension 72 of release lever 70 may carry a rearwardly directed laterally extending arcuate operating abutment 78 having the arcuate abutting surface 79.

The lower extension 73 of the release member 70 carries the laterally directed foot pedal portion 80 which, as best seen in Figure 7, overlies the rear edge of the main lever 7 and is inclined from the vertical somewhat less than the inclination of the pedal 9a of the main lever 7. The pedal element 80, however, is positioned adjacent and slightly spaced from the pedal 9 in order to permit simultaneous operation of the main lever 7 and the release member 70 by the foot of the operator as shown in the dotted lines of Figure 6.

It will be realized that whereas I have described and illustrated a practical and operative device, nevertheless, many changes may be made in the size, shape, number and disposition of parts without departing from the spirit and scope of my invention. I therefore wish my description and drawings to be taken as in a broad sense illustrative and diagrammatic, rather than as limiting me to my precise showing.

The use and operation of my invention are as follows—

Movement of the main lever 7 in counterclockwise direction as the parts are shown in the drawings, by pressure of the operator's foot against the pedal 9a, moves the roller 27 along the edge 3 and the serrations 4. Upon termination of foot pressure, the spring 22 continues to urge the roller 27 into engagement with the serrations 4. A spring, such as the spring 53 illustrated in Figure 3, urges the rod or cable 13 to the right and tends further to engage the roller 27 with the serrations 4, the brake lever 7 being held thereby in brakes-on position.

When it is desired to release the brake control mechanism of my invention, as illustrated in Figures 1–4, the operator presses downwardly on the handle 37. This rotates the release lever 36 to move the abutment 43 across the space between it and the abutment 31. Continued rotation of the release lever 36 moves the abutment 43 along the abutment surface 32 and rotates the clutch or locking lever 20 in clockwise direction to lift the roller 27 from the serrations 4 and thereby release the lock, the spring 53 being effective to return, through the member 13, the main lever 7 to brakes-off position, the abutment 5 being effective to limit movement of the brake lever 7 in clockwise direction.

The operator applies forward foot pressure to the pedal 80 to release the control mechanism of my invention illustrated in Figure 6 to rotate the releasing lever 70 in counterclockwise direction and thus to bring the abutment 78 into contact with the abutment 31 after moving it across the space therebetween. In the device of Figures 6 and 7 the operator may apply foot pressure only to pedal 9a and thus to apply the emergency brake which will lock upon application. To release the brake, the operator may thereafter apply foot pressure against the pedal 80. Should the operator wish to operate the device of Figures 6 and 7 as a substitute for the ordinary brake of a vehicle, that is to apply and release it alternately and in the amount required to control the vehicle, the operator need simply to apply foot pressure simultaneously to the pedals 9a, 80 as shown in dotted lines of Figure 6 to effectively hold the locking lever 20 in non-locking position while alternately applying the brakes through the medium of the main lever 7 and member 13.

I provide a delayed-action relationship as illustrated in the spaced abutments of Figures 1–7, in connection with my release mechanism. Thus the locking and releasing mechanisms are independent one of the other. Where the locking and releasing mechanisms are connected, in one manner or another, the operator may often inadvertently apply slight releasing pressure thereto. For example, a slight contact of the operator's foot with the pedal 80 might produce this result. Pivotal connections, for example, with the locking lever 20 may stick. Since it is one feature of the clutching mechanism 20, 26, 27, 4 to permit release upon the slightest disengagement of the roller 27 from the serrations 4, it can be seen that such slight separation may inadvertently occur. Since I provide herein a complete separation, in effect, between the locking lever 20 and its release mechanism, the quick and simple release capability of the clutch means is retained while a positive continuous movement of the release means toward releasing position is required since the action of the release mechanism is delayed momentarily.

I claim:

1. A control mechanism for emergency brakes and the like comprising a mounting plate, a main brake lever pivotally mounted on said plate, a locking lever pivotally mounted intermediate its ends on said main lever, a serrated edge on said plate, a roller rotatably mounted on said locking lever adjacent one end thereof and overlying said serrated edge, yielding means engaging said locking lever and said main lever and positioned to urge said roller into contact with said serrated edge at all positions of said main lever, a release lever pivotally mounted intermediate its ends on said mechanism at a point spaced from the pivotal mounting of said locking lever, a second yielding means engaging said release lever and said mechanism, said release lever having one of its ends positioned in spacedly adjacent and disconnected relationship with the opposite end of said locking lever, said second yielding means being positioned to urge said release lever end away from said last named locking lever end, said release lever end being movable into engagement with said locking lever end against the action of said second yielding means at all positions of said main lever and said locking lever to urge said locking lever toward non-locking position against the action of said first yielding means.

2. A control mechanism for emergency brakes and the like comprising a mounting plate, a main lever pivotally mounted on said plate at a point intermediate its ends, a locking lever pivotally mounted at a point intermediate its ends and adjacent one end of said main lever, a serrated edge on said plate, a roller overlying said serrated edge, said roller being rotatably mounted on and adjacent one end of said locking lever, yielding means engaging said locking lever and said main lever and urging said roller toward said serrated edge, said locking lever carrying at its opposite end an abutment element, a release lever pivotally mounted intermediate its ends on said main lever, an abutment element carried at one end of said release lever, said release and locking levers being entirely separate and disconnected one from the other, said release abutment being spaced from said locking lever abutment and positioned at one side of said locking lever, yielding means engaging said release lever and said main lever and positioned to urge said release lever abutment away from said locking lever abutment, said release lever being pivotally movable to bring said release lever abutment into engagement with said locking lever abutment and to urge said locking lever in one direction only to raise said roller from said serrated edge against the action of said first yielding means, said release and locking lever abutments being spaced one from the other at all positions of said main lever, said release lever abutment being movable into engagement with said locking lever abutment at all positions of said main lever.

3. A control mechanism for emergency brakes and the like comprising a base, a main lever pivotally mounted intermediate its ends on said base, a detent means mounted on said base, a locking lever pivotally mounted adjacent one end of said lever and carrying a locking element positioned to engage said detent means, yielding means engaging said locking lever and said main lever and positioned to urge said locking element into engagement with said detent means, a release lever entirely separate from and unconnected with said locking lever, said release lever being pivotally mounted intermediate its ends on said mechanism, said locking and release levers having opposed, spaced end portions, a second yielding means engaging said mechanism and said release lever and positioned to urge one end of said release lever away from the opposed end of said locking lever, said release lever being pivotally movable to bring said end of said release lever into operating engagement with said opposed end of said locking lever to urge said locking lever toward non-locking position against the action of said first yielding means, thereby to move said locking element away from said detent means.

4. A control mechanism for emergency brakes and the like comprising a base, an arcuate serrated edge on said base, a main lever pivotally mounted on said base and having an end portion movable in an arcuate path alongside said serrated edge, a locking lever pivotally mounted intermedate its ends on said main lever end portion, a roller rotatably mounted on said locking lever and overlying said edge, a first yielding means engaging said locking lever and said main lever and urging said roller toward said serrated edge, said locking lever extending in a plane paralleling that occupied by said main lever and carrying an abutment, a release lever pivotally mounted on said main lever at a point intermediate its ends, said release lever having one of its ends lying in the plane occupied by said locking lever abutment and carrying an actuating abutment, said actuating abutment being spaced from and in alignment with said locking lever abutment, a second yielding means engaging said release lever and said main lever to urge said actuating abutment away from said locking lever abutment, said first and second yielding means being positioned to maintain said actuating and locking lever abutments in spaced relationship at all positions of said main lever, said release lever being pivotably movable in one direction to bring said actuating abutment into actuating engagement with said locking lever abutment at all positions of said main lever and being pivotably movable further in said one direction to urge said locking lever toward non-locking position.

References Cited in the file of this patent

UNITED STATES PATENTS

| | | |
|---|---|---|
| 738,100 | Cuntz | Sept. 1, 1903 |
| 837,043 | Discher | Nov. 27, 1906 |
| 1,904,178 | Vaughn | Apr. 18, 1933 |
| 2,014,300 | Strobridge | Sept. 10, 1935 |
| 2,180,307 | Lucker | Nov. 14, 1939 |
| 2,308,898 | Skareen | Jan. 19, 1943 |
| 2,467,557 | Jandus | Apr. 19, 1949 |
| 2,694,945 | Jandus | Nov. 23, 1954 |
| 2,722,136 | Krause | Nov. 1, 1955 |
| 2,872,830 | Hinsey | Feb. 10, 1959 |
| 2,875,641 | Powell | Mar. 3, 1959 |
| 2,881,637 | Hinsey | Apr. 14, 1959 |